Patented June 1, 1954

2,680,132

UNITED STATES PATENT OFFICE 2,680,132

PROCESS FOR MAKING NEUTRAL ESTERS OF SELENOPHOSPHORIC ACID

Gerhard Schrader, Opladen-Bruchhausen, and Walter Lorenz, Wuppertal-Elberfeld, Germany, assignors to Farbenfabriken Bayer Aktiengesellschaft, Leverkusen, Germany, a corporation of Germany No Drawing. Application August 15, 1950, Serial No. 179,628

Claims priority, application France August 20, 1949

2 Claims. (Cl. 260—461)

The present invention relates to new derivatives of phosphoric acid and to a process of making the same. More particularly it relates to a special group of neutral esters of selenophosphoric acid.

These new compounds correspond to the general formula:

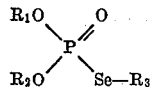

In the above formula $R_1$ and $R_2$ mean alkyl radicals, and $R_3$ stands for alkyl, aralkyl and aryl. The radicals $R_1$ and $R_2$ may be different or the same; they are preferably lower alkyl radicals such as methyl and ethyl. Of the radical $R_3$ it is to be mentioned that in case it is alkyl or aralkyl, the alkyl radical attached to selenium may be interrupted by the hetero-atom sulfur. By way of example for $R_3$ the following radicals are mentioned: methyl, ethyl, propyl, butyl, hexyl, dodecyl, benzyl, naphthylmethyl (menaphthyl), phenyl and substituted phenyl such as chlorophenyl, nitrophenyl, methoxyphenyl, methylphenyl. Examples of radicals $R_3$ interrupted in the chain linked to selenium are methylmercaptoethyl, ethylmercaptoethyl, phenylmercaptoethyl, (methylphenyl)-mercaptoethyl.

As we have found the new compounds can easily be prepared by reacting selenocyanides of the formula $R_3 \cdot SeCN$, wherein $R_3$ means the same as stated above, with dialkyl phosphites or their alkali salts. The dialkyl phosphites and their alkali salts:

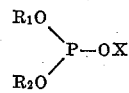

$R_1$ and $R_2$ being the same as stated above, and X standing for hydrogen or alkali, react, as is well known, in the tautomeric form:

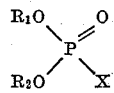

In this reaction besides the desired neutral esters of selenophosphoric acid either hydrocyanic acid or alkali cyanide is formed according to the use of either dialkyl phosphites or their alkali salts. The reaction of the said selenocyanides with the said phosphites is preferably carried out in an inert diluent such as benzene, toluene or the like. The temperature of reaction ranges between room temperature and about 100° C.; as a rule temperatures between 30 and 60° C. are sufficient to carry through the reaction within a reasonable time; in some cases it may prove convenient to apply slightly higher temperatures. From the reaction mixtures the selenophosphoric esters are isolated by customary methods.

The new compounds are oily compounds of high boiling-point or crystalline substances; they are in general but slightly soluble in water and have a characteristic smell; their vapor pressure at ordinary temperature is very low. The main characteristic of the new selenophosphoric esters is their insecticidal property. They are valuable contact-insecticides and show a chemo-therapeutic effect in living plants; they are so-called systemic insecticides. Of particular value among the compounds of this new class of insecticides are those of the above disclosed esters which are interrupted by sulfur in the alkyl chain linked to selenium. For the control of suctorial and chewing insects they are applied in the usual way either as dilute aqueous solutions, or emulsions, or as dusts in admixture with inert pulverulent dilents as they are customary in insect controlling agents. On account of the systemic insecticidal properties of the new compounds besides by the usual spraying or dusting of the living plants the pest control can also be effected by watering the plants with their aqueous solutions.

The invention is illustrated by the following examples, without being limited thereto.

Example 1

12 grams of sodium powder are suspended in 100 cc. of toluene. While stirring 70 grams of diethyl phosphite are added thereto at 40–50° C. When the sodium is dissolved, 60 grams of methyl selenocyanide are added drop by drop, while stirring, at a temperature of 30–40° C. The reaction taking place is rather violent. After the reaction has taken place, the temperature is kept at 30° C. for half an hour. To remove the formed sodium cyanide, 10 cc. of water are added to the reaction mixture, and the toluene layer is separated. By fractionating the toluene solution, 52 grams of 0,0-diethyl Se-methyl selenophosphate of B. P. 4mm. 100–103° C. are obtained. The compound is soluble in water and corresponds to the formula:

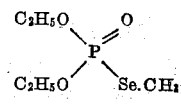

Example 2

35 grams of diethyl phosphite are dissolved in 50 cc. of toluene. 34 grams of methyl selenocyanide are added to this solution at 40° C. Thereafter, while stirring, the temperature is kept at 50° C. for two hours. By fractionating the crude product, 45 grams of O,O-diethyl Se-methyl selenophosphate of B. P. 2.5 mm. 95° C. are obtained.

Example 3

6 grams of sodium are, as in Example 1, dissolved in 50 cc. of toluene and 35 grams of diethyl phosphite. Thereafter, while stirring, 34 grams of ethyl selenocyanide are added at a temperature of 30° C. After the addition of the ethyl selenocyanide, this temperature is kept for half an hour. After cooling 10 cc. of water are added, and the mixture is worked up as in Example 1. 29 grams of O,O-diethyl Se-ethyl selenophosphate of B. P. 2 mm. 102–105° C. are obtained, corresponding to the formula:

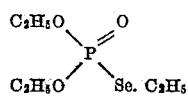

In a similar way the following compounds are obtained:

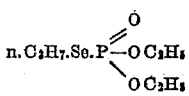  B. P. 2 mm. 105° C.

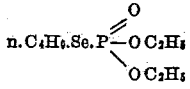  B. P. 2 mm. 122° C.

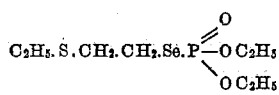  B. P. 2 mm. 153° C.

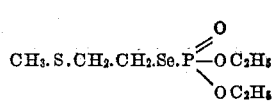  B. P. 2 mm. 152° C.

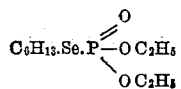  B. P. 2 mm. 138° C.

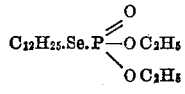  B. P. 2 mm. 198° C.

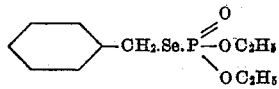  B. P. 2 mm. 154° C.

Example 4

55 grams of phenylselenocyanide are heated in 250 cc. of benzene together with 48 grams of diethyl phosphite to 60–70° C., while stirring. The elimination of hydrocyanic acid takes place already at 40° C. By fractionating the crude product, 77.5 grams of O,O-diethyl Se-phenyl selenophosphate of B. P. 2 mm. 141–142° C. are obtained, corresponding to the formula:

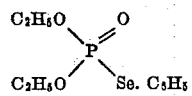

Example 5

6 grams of sodium are dissolved in 150 cc. of benzene and 42 grams of diethyl phosphite. While stirring, 55 grams of phenylselenocyanide are added at 50–60° C., and the temperature is kept for a further hour at 60° C. Then, for removing the sodium cyanide, 10 cc. of water are added, and the benzene layer is separated and fractionated. 21.5 grams of O,O-diethyl Se-phenyl selenophosphate of B. P. 2 mm. 141–143° C. are obtained.

Example 6

43 grams of 4-chlorophenyl selenocyanide are heated in 250 cc. of benzene with 31 grams of diethyl phosphite for two hours to 60–70° C. By fractionating the reaction mixture, 61 grams of O,O-diethyl Se-p-chlorophenyl selenophosphate of B. P. 1 mm. 172–174° C. are obtained, corresponding to the formula:

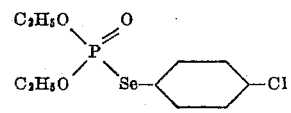

In a similar way the following aromatic selenophosphoric acid esters can be produced:

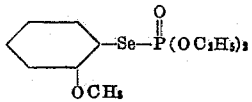  B. P. 2 mm. 175–176° C.

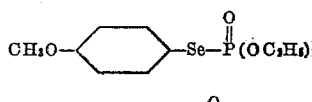  B. P. 2 mm. 182–184° C.

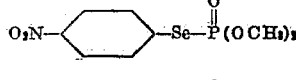  M. P. 69° C.

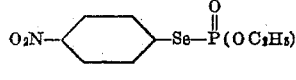  M. P. 53–54° C.

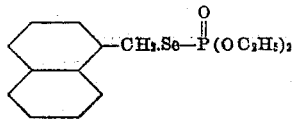  viscous, light yellow oil, not distillable in high vacuum

Example 7

Little peach-trees the leaves of which are already quite rolled-up by the attack of the green peach aphid, are sprayed with an aqueous solution containing 0.02 per cent of the compound:

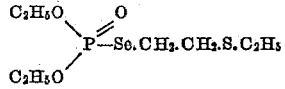  B. P. 2 mm. 153° C.

Although the aphides living inside the rolled-up leaves are not contacted by the aqueous spray, living aphides are no longer found at opening the leaves after 12 hours.

Example 8

A little apple-tree planted in a large flower-pot is watered at its roots on two subsequent days with each 100 cc. of a 0.02 per cent solution of the compound applied in Example 7. After 3 days, aphides are placed on the leaves of the tree. These aphides are killed already after several hours.

Example 9

Mosquito larvae are put into a test tube containing the insecticidal compound used in the preceding examples in a dilution of $1:10^{-5}$. In this 0.00001 per cent solution the mosquito larvae are killed after 1 hour.

Example 10

Potato plants infested by Colorado beetles and their larvae are powdered with a dust containing 2 per cent of the active substance used in Examples 7–9. After 3–4 hours beetles and larvae are killed.

*Example 11*

A Petri dish is powdered with 20 milligrams of a dust containing 2 per cent of the active substance used in the preceding examples. Flies being placed into this Petri dish are all killed within 11 minutes.

*Example 12*

A 0.005 per cent aqueous solution containing as active compound:

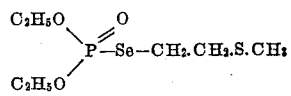 B. P. ₁ mm. 152° C.

is sprayed on chrysanthemums which are infested by aphides. After 4–5 hours the aphides are killed.

A similar effect has the following compound:

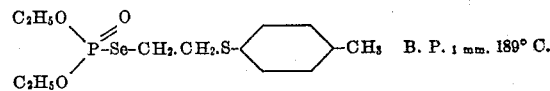 B. P. ₁ mm. 189° C.

We claim:
1. A process for producing selenophosphoric esters of the general formula:

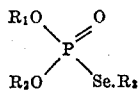

wherein $R_1$ and $R_2$ each stand for one of the group consisting of methyl and ethyl, and $R_3$ stands for one of the group consisting of alkyl radicals, aralkyl radicals and aryl radicals, comprising reacting a dialkyl phosphite:

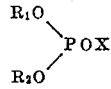

X being selected from the group consisting of hydrogen and an alkali metal, and a selenocyanide of the formula $R_3$.SeCN in an inert diluent at temperatures ranging from room temperature to about 100° C., $R_1$, $R_2$ and $R_3$ having the same meaning as defined above.

2. A process for producing selenophosphoric esters of the general formula:

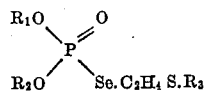

wherein $R_1$ and $R_2$ each stand for one of the group consisting of methyl and ethyl, and $R_3$ stands for one of the group consisting of alkyl radicals, aralkyl radicals and aryl radicals, comprising reacting a dialkyl phosphite:

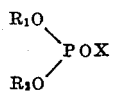

X being selected from the group consisting of hydrogen and an alkali metal, and a selenocyanide of the formula $R_3$.S.$C_2H_4$.SeCN in an inert diluent at temperatures ranging from room temperature to about 100° C., $R_1$, $R_2$ and $R_3$ having the same meaning as defined above.

References Cited in the file of this patent

UNITED STATES PATENTS

| Number | Name | Date |
|---|---|---|
| 2,506,049 | Waitkins | May 2, 1950 |
| 2,565,920 | Hook et al. | Aug. 28, 1951 |
| 2,586,655 | Hook et al. | Feb. 19, 1952 |
| 2,586,656 | Hook et al. | Feb. 19, 1952 |

OTHER REFERENCES

Pistschimuka J. Prakt. Chemie. (1911), vol. 84, pp. 746–760.

Pistschimuka J. Prak. Chem., vol. 192 (1911), p. 755.

Pistschimuka J. Russ. Phys. Chem. vol. 44, pp. 1406 to 1554 as abstracted in Chem. Abstracts (1913), vol. 7, pp. 987–990.

Foss Acta Chem. Scand. vol. 1, pp. 8–31 (1947), as abstracted in Chem. Abstr. vol. 42, col. 2537 (1948).